Jan. 17, 1933.  J. W. TATTER  1,894,525
BRAKE
Filed Nov. 7, 1929

INVENTOR
John W Tatter.
BY W. W. Harris
ATTORNEY

Patented Jan. 17, 1933

1,894,525

UNITED STATES PATENT OFFICE

JOHN W. TATTER, OF CHICAGO, ILLINOIS, ASSIGNOR TO LEWIS DIFFERENTIAL COMPANY, OF CHICAGO, ILLINOIS, A CORPORATION OF ILLINOIS

BRAKE

Application filed November 7, 1929. Serial No. 405,467.

My invention relates to brakes and refers more particularly to fluid brake systems such as are used for motor vehicles and commonly referred to as hydraulic brake systems.

One difficulty experienced with liquid brake systems lies in the expansion and contraction of the liquid in response to temperature changes. Such liquid volume change alters the setting of the brakes which is undesirable.

It is an object of my invention to facilitate the operation of a fluid brake system of a motor vehicle or the like by providing a device for compensating for changes in volume of the liquid in the brake system, whereby the brake band clearance with the drum, and the general brake operation and setting remains substantially the same irrespective of temperature changes.

Further objects of my invention reside in the provision of a simply constructed compensating device consisting of few parts for accomplishing the objects in view, this device being capable of manufacture at relatively low cost.

Figure 1:
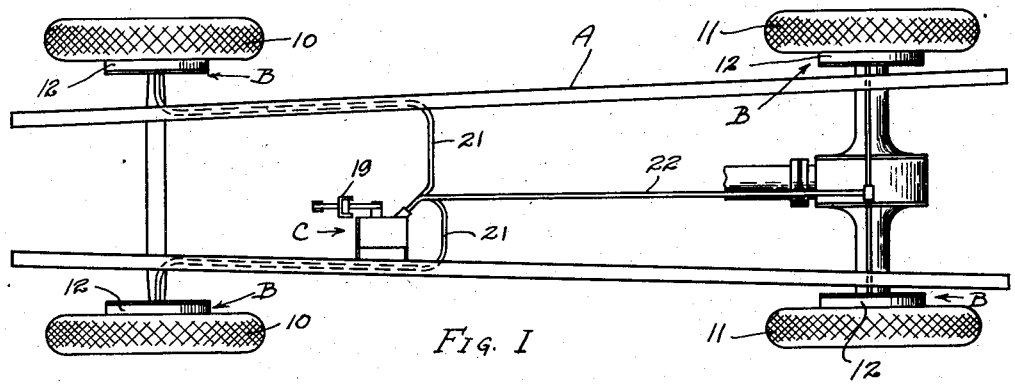
Figure 3:
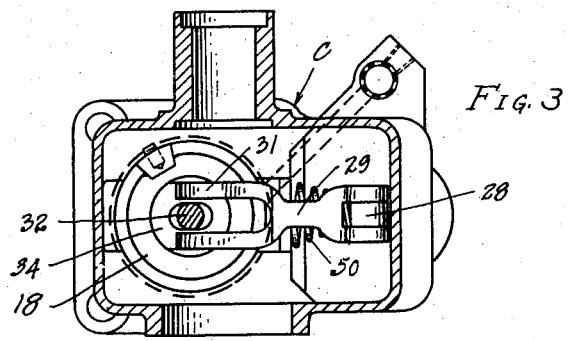
Figure 4:
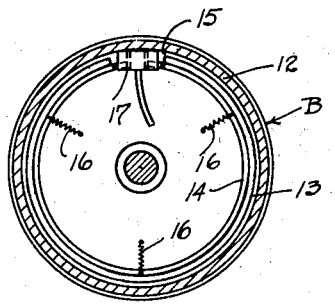
Figure 2:
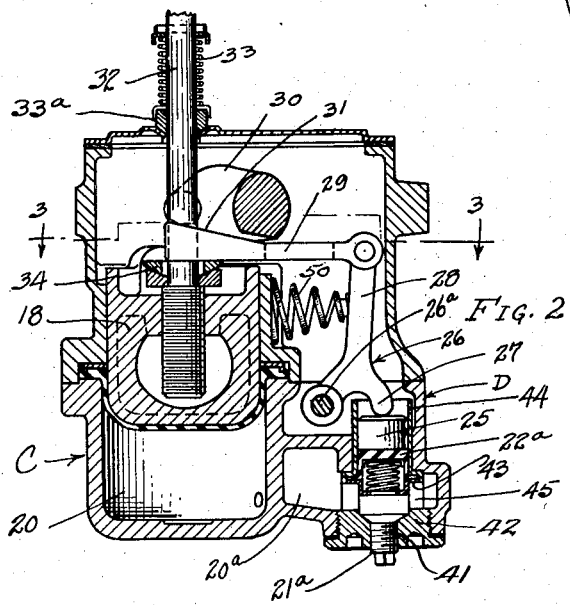

Referring to the accompanying drawing illustrating one embodiment of my invention, Figure 1 is a diagrammatic view of a motor vehicle chassis illustrating my improvement in combination with a typical fluid brake system, Fig. 2 is a vertical sectional view of my compensating device, Fig. 3 is a plan sectional view taken substantially on the line 3—3 of Fig. 2, and Fig. 4 is a diagrammatic sectional view of a conventional wheel brake device.

In the drawing, reference character A represents a motor vehicle chassis having the usual front and rear wheels 10 and 11 respectively, these wheels having associated therewith the fluid actuated brake devices B. The brake system illustrated is a four wheel brake system which is customary at present although my improvements may be used to advantage in other fluid brake arrangements.

In Fig. 4 I have illustrated somewhat diagrammatically a typical wheel brake unit or device B which ordinarily comprises a drum 12 engageable by friction band 13 carried by one or more shoes 14 herein illustrated as the internal expanding type. The band 13 is normally spaced from drum 12 to provide clearance 15 sufficient to permit free rotation of the drum and associated wheel. The shoe 14 and band 13 are yieldingly held in such position by one or more springs 16 generally assisted by the inherent resilience of shoe 14. When the braking action takes place liquid under pressure expands shoe 14 by reason of the cylinder and piston unit 17, the friction band 13 being moved into braking engagement with the drum as will be readily understood. It is customary to provide a master cylinder or fluid pressure controlling means C having a piston 18 moved by foot pedal 19 to place the liquid 20 in a cylinder C under pressure. The fluid 20 may be of suitable characteristics such as now commercially used in fluid brake systems. The cylinder C communicates with pipes or conduits 21 and 22 respectively leading to the cylinder units 17 associated with the front and rear wheel brake devices B.

After the brake system has been adjusted to provide the clearance 15 it will be apparent that any change in temperature will result in a change in volume of the liquid in the system causing variation in the clearance 15 and consequent variation in the braking operation. As an illustration of this generally undesirable condition let it be presumed that the system is in operation on a relatively cold winter day with the clearance 15 properly adjusted for such temperature. Suppose that the vehicle is driven into a heated garage and thus subjecting the system to an appreciable rise in temperature. The liquid in the system will expand, moving the shoe 14 and often taking up clearance 15 so as to exert a braking effort on drum 12. When the vehicle is driven from the garage the brakes will be applied until released by contraction of the liquid. Excessive clearance at 15 is undesirable since this causes excessive lost motion in the piston 18 and pedal 19. Other circumstances giving rise to temperature changes are commonly experienced, such as normal climatic temperature changes which act to increase or decrease the normal predetermined desirable clearance 15 according to whether the system is exposed to decreasing or increasing temperatures.

Referring to Fig. 2 I have provided a compensating device D which will automatically vary a given volume of liquid in proportion to temperature changes, the clearance 15 being unchanged by the influence of such temperature change. This is particularly desirable in a closed liquid system where, ordinarily, the only relief for an increase in liquid volume is at the clearance 15. Thus at some suitable point in the system, such as adjacent to cylinder C, I provide a compensating chamber 20$^a$ filled with a liquid, preferably having the same general characteristics of expansion and contraction as the liquid 20 in the brake system. Chamber 20$^a$ is closed by a plug 21$^a$ and a yielding cup or diaphragm 22$^a$, which may be formed of rubber composition, bounds a portion of the chamber.

The expansion of the liquid in the chamber 20$^a$ will raise the plunger 25 and actuate the bell crank 26 pivoted at 26$^a$ to the casing. As illustrated in Fig. 2, one of the arms 27 of the bell crank is engaged by the plunger, while the other arm 28 of the bell crank is pivotally connected with a cam 29, that is interposed between the actuator arm 30 operated by the foot pedal 19 and the piston 18. The cam 29 is forked, as shown in Fig. 3 and its upper face which is engaged by the actuator arm 30, is inclined as at 31. The rod 32 is secured to the piston 18 and is yieldingly forced upwardly by a spring 33. The rod 32 swivelly supports a follower 34, that engages the underside of the cam 29, the cam being arranged to separate the actuator arm 30 from the follower 34 carried by the rod 32. As the bell crank 26 is actuated, the cam 29 is also actuated. This cam will be moved to the left, as viewed in Fig. 2, when the plunger 25 is raised by the expanding fluid in the chamber 20$^a$, consequently the piston 18 is free to move upwardly under the influence of the expansive action of the liquid beneath piston 18, supplemented if desired by the spring 33. The spring 33 is primarily adapted to seat a sealing bushing 33$^a$. The construction of the cam 29 is such that the distance between the actuator arm and piston is varied, as the cam is moved.

Thus, as the liquid in the system is expanded or contracted when subjected to various temperature changes externally thereof, the liquid in the chamber 20$^a$ is expanded or contracted since it is responsive to the same temperature changes. Therefore, the relative variation in volume of the liquid in the brake system is compensated by the variation in size of the master cylinder C controlled by the fluid pressure compensating device as described above.

The liquid in the chamber 20$^a$ may be placed under pressure by adjustably screwing in the plug 21$^a$ that closes the filler opening 41 in the cap 42. The cap 42 abuts the lower rim of the washer 43 that serves as a retainer for the flexible rubber cup 22$^a$, the said rubber cup and plunger 25 slidable in the sleeve or cylinder 44, that is supported by the casing. The cap is provided with slots 45, that places the chamber 20$^a$ in communication with the interior of the flexible rubber cup or diaphragm 22$^a$. A spring 50 acts upon the arm 28 of the bell crank to yieldingly engage the arm 27 with the plunger 25, and opposes the forces created by the expansion of the liquid in chamber 20$^a$.

Let us assume that the system is subjected to a temperature rise. The liquid in the brake system will expand and likewise the liquid in the closed chamber 20$^a$ will expand. The expansion of the incompressible liquid in chamber 20$^a$ will readily flex the diaphragm 22$^a$ upwardly causing the plunger 25 to move upwardly and thereby increase the volume of the master cylinder C connected with the liquid brake system, as described in the foregoing paragraphs. Thus instead of clearance 15 being reduced by a temperature rise, the volume of the liquid system is increased in proportion to the temperature rise so as to automatically compensate for such variation in liquid volume. When the system is subjected to a temperature drop, the reverse occurs and the master cylinder is reduced in size, always maintaining the given clearance at 15.

The brake system illustrated is the closed type wherein on change of volume of the liquid in the system, the liquid has no outlet other than provided by the liquid sealed closed system itself.

It will thus be seen, that I have provided a piston adjustably supported in the master cylinder, and means responsive to temperature changes for adjusting the piston to vary the volume of the closed liquid system, thus maintaining the clearance between the band 13 and the drum 12 substantially constant.

Although I have illustrated but one form of my invention and have described in detail but a single application thereof, it will be apparent to those skilled in the art to which my invention pertains, that various modifications and changes may be made therein without departing from the spirit of my invention or from the scope of the appended claims.

What I claim as my invention is:

1. In a device of the character described, the combination with a brake device, of means for actuating said brake device and comprising a closed liquid system of substantially constant volume and including a master cylinder; a piston adjustable in the master cylinder to vary the volume of the liquid system, means for actuating the piston for placing the liquid in the system under pressure, and means responsive to temperature changes for adjusting the piston.

2. In a device of the character described, the combination with a brake device, of means for actuating said brake device and comprising a closed liquid system of substantially constant volume and including a master cylinder, a piston associated with said master cylinder, means for actuating the piston for placing the liquid in the system under pressure, and means acting on said piston to vary the volume of the closed liquid system to compensate for temperature changes.

3. In a device of the character described, the combination with a brake device, of means for actuating said brake device and comprising, a closed liquid system of substantially constant volume and including a master cylinder, a piston, means for actuating the piston for placing the liquid in the system under pressure, and means responsive to temperature changes and acting on said piston to vary the volume of the closed liquid system to compensate for temperature changes.

4. In a device of the character described, the combination with a brake device, of means for actuating said brake device and comprising, a closed liquid system of substantially constant volume and including a master cylinder, a piston, means for actuating the piston for placing the liquid in the system under pressure, and means responsive to temperature changes for moving said piston relative to the master cylinder to vary the volume of the closed liquid system to compensate for temperature changes.

5. In a device of the character described, the combintion with a brake device, of means for actuating said brake device and comprising, a closed liquid system of substantially constant volume and including a master cylinder, a piston, means for actuating the piston for placing the liquid in the system under pressure, and mechanical means responsive to temperature changes for moving said piston relative to the master cylinder to vary the volume of the closed liquid system to compensate for temperature changes.

6. In a device of the character described, the combination with a brake device, of means for actuating said brake device and comprising, a closed liquid system of substantially constant volume and including a master cylinder, a piston, adjustable in said master cylinder, means for actuating the piston for placing the liquid in the system under pressure, and a compensating device for varying the volume of the closed liquid system and comprising, a closed variable volume chamber responsive to temperature changes and means connected with said variable volume chamber for adjusting said piston to compensate for temperature changes.

7. In a device of the character described, the combination with a brake device, of means for actuating said brake device and comprising, a closed liquid system of substantially constant volume and including a master cylinder, a piston adjustable in said master cylinder, means for actuating the piston for placing the liquid in the system under pressure, and a compensating device for varying the volume of the closed liquid system and comprising, a closed variable volume chamber responsive to temperature changes, and mechanical means responsive to action of said variable volume chamber for adjusting said piston to compensate for temperature changes.

8. In a device of the character described, the combination with a brake device, of means for actuating said brake device and comprising, a closed liquid system of substantially constant volume and including a master cylinder, a piston, adjustable in said master cylinder, means for actuating the piston for placing the liquid in the system under pressure, and a compensating device for varying the volume of the closed liquid system and comprising, a chamber containing a liquid responsive to temperature changes, a diaphragm bounding a portion of said chamber, and means transmitting movement of said diaphragm to the piston for adjustably varying the volume of said closed liquid system in response to temperature changes.

9. In a device of the character described, the combination with a brake device, of means for actuating said brake device and comprising, a closed liquid system of substantially constant volume and including a master cylinder, a piston, adjustable in said master cylinder, means for actuating the piston for placing the liquid in the system under pressure, a compensating device for varying the volume of the closed liquid system and comprising, a chamber containing a liquid responsive to temperature changes, a diaphragm bounding a portion of said chamber, a plunger operatively connected with said diaphragm, and mechanical means for connecting said plunger to said piston for transmitting movement of said plunger to the piston for adjustably varying the volume of said closed liquid system in response to temperature changes.

10. In a device of the character described, the combination with a brake device, of means for actuating said brake device and comprising, a closed liquid system of substantially constant volume and including a master cylinder, a piston, adjustable in said master cylinder, means for actuating the piston for placing the liquid in the system under pressure, a compensating device for varying the volume of the closed liquid system and comprising, a chamber containing a liquid responsive to temperature changes, a diaphragm bounding a portion of said chamber, a plunger operatively connected with said diaphragm, and mechanical means for connecting said plunger to said piston for transmitting movement of said plunger to the piston, and including a bell crank and a cam element, the plunger engaged with one arm of said bell crank and the cam element connected with the other arm of said bell crank and to said piston for adjustably varying the volume of said closed liquid system in response to temperature changes.

11. In a device of the character described, the combination with a brake device, of means for actuating said brake device and comprising, a closed liquid system of substantially constant volume and including a master cylinder, a piston, adjustable in said master cylinder, means for actuating the piston for placing the liquid in the system under pressure, and a compensating device for varying the volume of the closed liquid system and comprising means responsive to temperature changes and arranged to be engaged intermediate the piston and the means for actuating the same for adjustably varying the volume of said closed liquid system in response to temperature changes.

12. In a device of the character described, the combination with a brake device, of means for actuating said brake device and comprising, a closed liquid system of substantially constant volume and including a master cylinder, a piston, adjustable in said master cylinder, means for actuating the piston for placing the liquid in the system under pressure, and a compensating device for varying the volume of the closed liquid system and comprising means responsive to temperature changes and arranged intermediate the piston and means for actuating the same to vary the relative position of said adjustable piston in said master cylinder for adjustably varying the volume of said closed liquid system in response to temperature changes.

13. In a brake apparatus including cooperating braking elements having a clearance when inoperative, a master cylinder, a piston, adjustable in said master cylinder, a closed liquid containing system transmitting liquid pressure induced by the piston to move said braking elements relatively into braking engagement, a compensating liquid containing chamber responsive to temperature changes, a diaphragm bounding a portion of said compensating chamber, and means transmitting movement of the said diaphragm to the piston for adjustably varying the volume of said closed liquid system, thereby maintaining said clearance against variation under the influence of temperature change.

In testimony whereof I affix my signature.

JOHN W. TATTER.